United States Patent [19]

Prince et al.

[11] 4,406,212

[45] Sep. 27, 1983

[54] HYDRAULIC APPARATUS

[75] Inventors: Laurence A. Prince, Cottingham near Hull; Kevin M. Twigger, Hull, both of England

[73] Assignee: British Aerospace Public Limited Company, London, England

[21] Appl. No.: 160,365

[22] Filed: Jun. 17, 1980

[30] Foreign Application Priority Data

Jun. 19, 1979 [GB] United Kingdom ............... 7921263

[51] Int. Cl.³ .................... F15B 13/042; F15B 11/16
[52] U.S. Cl. ............................ 91/28; 91/33; 91/460; 91/510; 91/518
[58] Field of Search .............. 91/28, 29, 33, 460, 91/510, 518, 509; 60/430, 486

[56] References Cited

U.S. PATENT DOCUMENTS

| 2,905,191 | 9/1959 | Vander Kaay | 60/430 |
| 3,016,708 | 1/1962 | Gordon | 91/460 |
| 3,260,165 | 7/1966 | Larsen | 91/33 |
| 3,513,751 | 5/1970 | Escobosa | 91/33 |
| 3,822,551 | 7/1974 | Smith | 60/486 |
| 4,002,027 | 1/1977 | Eley | 60/430 |
| 4,006,663 | 2/1977 | Baatrup | 91/29 |

FOREIGN PATENT DOCUMENTS 380537 7/1964 Switzerland .................. 91/460

Primary Examiner—Abraham Hershkovitz
Attorney, Agent, or Firm—Cushman, Darby & Cushman

[57] ABSTRACT

Hydraulic apparatus (7), for use where a hydraulic actuator (42) is powered by a first hydraulic supply (40) or selectively and alternatively by a second hydraulic supply (41) independent of the first, which, when a fault occurs, will establish whether the actuator or the first hydraulic supply is at fault, and if it is the first hydraulic supply will isolate that supply and select the second hydraulic supply, but if it is the actuator will ensure that both supplies are isolated. Moreover, the apparatus will establish whether the actuator fault is tolerable and if it is, will select the second supply. By the arrangement described a second hydraulic supply is selected when the first fails, but if the actuator is at fault the second supply will only be selected if that fault is tolerable; if the second supply were to be selected if the actuator was intolerably faulty, failure of the second supply would follow in rapid succession.

10 Claims, 4 Drawing Figures

HYDRAULIC APPARATUS

This invention relates to hydraulic apparatus for use where an actuator assembly is powered by a first hydraulic supply assembly or selectively and alternatively by a second hydraulic supply assembly.

In this specification, the term 'actuator assembly' includes both an actuator and its associated delivery and delivery return ducts, and the term 'hydraulic supply assembly' includes both a source of hydraulic pressure and its associated supply and supply return ducts.

Where an actuator assembly is powered by the first hydraulic supply assembly and a failure occurs, evidenced by low pressure, either the first hydraulic supply or the actuator assembly can be at fault. Accordingly, it is an object of the present invention to provide apparatus which will establish the source of the fault.

Clearly, if the first hydraulic supply assembly is at fault, then the second hydraulic supply can be selected, but if it is the actuator assembly, then selection of the second hydraulic supply could merely serve to exacerbate the problem. It is therefore a further objective of the invention to provide apparatus which will ensure that the second hydraulic supply is selected only if the actuator assembly is not at fault or that its fault is tolerable.

Naturally, if the failure of the actuator assembly is only partial, then that actuator can be powered for some period by the second hydraulic supply assembly. It is therefore yet a further objective of the invention to provide apparatus which will test the degree of any actuator assembly failure and only if that failure is tolerable will select the second hydraulic supply assembly.

When more than one actuator assembly is powered by the same first hydraulic supply assembly, as is the case in many aircraft hydraulic systems, it is necessary not only to establish whether a fault, if such does occur, is in the first hydraulic supply assembly or the actuator assemblies generally, but also, if the failure is in the actuator assemblies, to establish just which actuator assembly is at fault so that, in the event of an intolerable failure, that actuator assembly alone can be isolated. It is yet a further objective of the present invention to provide apparatus which, when included in such a multiple actuator arrangement, will identify and isolate an intolerably faulty actuator assembly.

According to the present invention, hydraulic apparatus includes first supply and supply return ducts for connection to a first hydraulic supply assembly, second supply and supply return ducts for connection to a second hydraulic supply assembly, delivery and delivery return ducts for connection to an actuator assembly, multi-position valve means which, in a first position, isolates the second supply and supply return ducts and connects the first supply and supply return ducts to the delivery and delivery return ducts, in a second position isolates both the first and second supply and supply return ducts from the delivery and delivery return ducts, and in a third position isolates the first supply and supply return ducts and connects the second supply and supply return ducts to the delivery and delivery return ducts, selecting means for selecting the first position in response to normal pressures within the first supply and supply return ducts and the delivery and delivery return ducts, for selecting the second position from the first position in response to abnormally low pressures within either the first supply and supply return ducts or the delivery and delivery return ducts, and for selecting the third position from the second position in response to the attainment of a test pressure in the delivery and delivery return ducts, pressurising means for attempting to attain said temporary test pressure when the second position is selected, and means ensuring that if the test pressure is not attained, the second position remains selected.

Preferably, means are also provided which ensure that when the third position is selected it remains selected.

A preferred embodiment of the apparatus is described with reference to the accompanying drawings in which.

Figure 1:
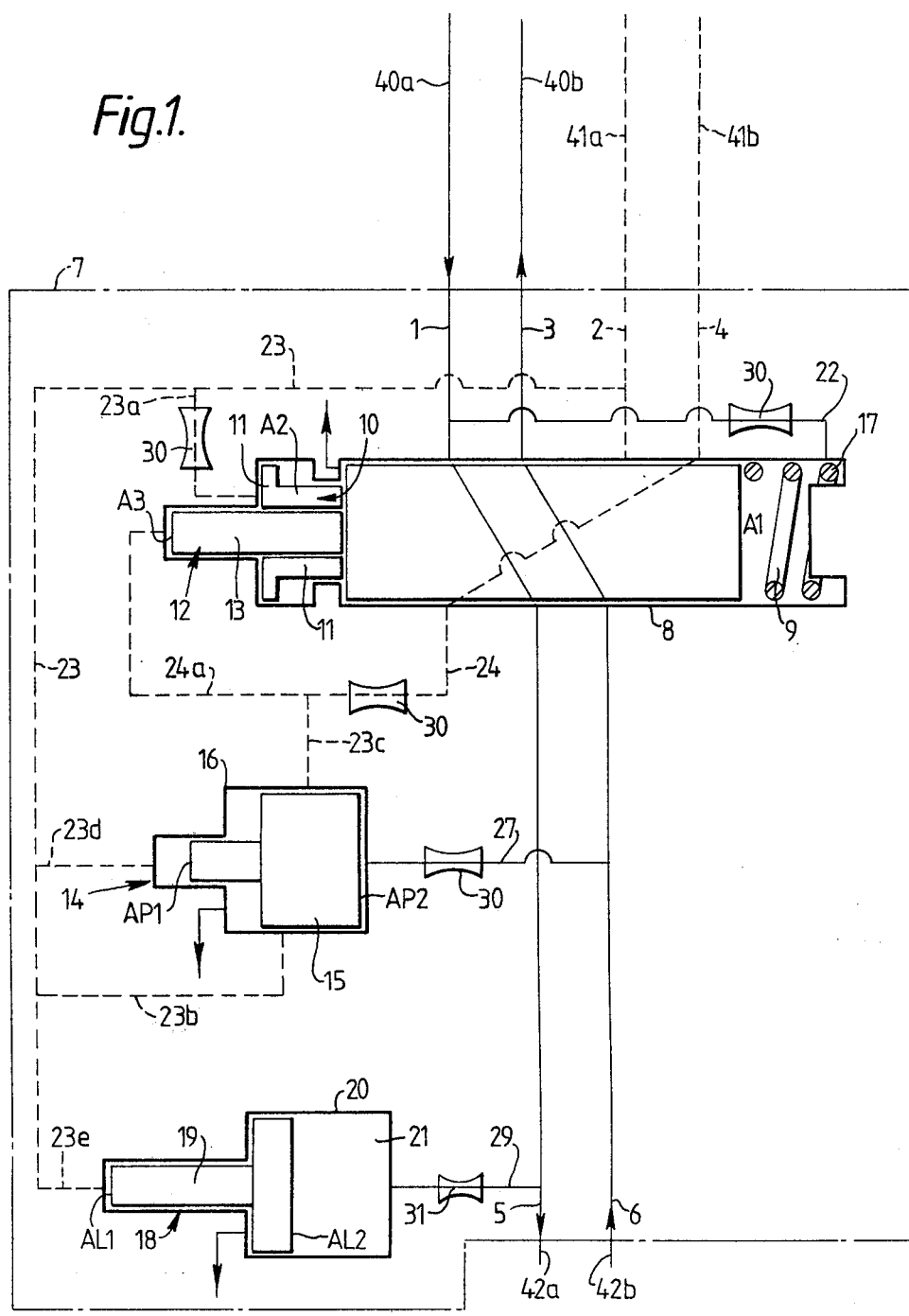
FIG. 1 is a diagram of the apparatus in one condition.

In the drawings, a first hydraulic supply assembly, including a first source of hydraulic pressure (not shown) and associated supply and supply return ducts, supplies pressurised hydraulic fluid to a supply duct 1 whilst a second hydraulic supply assembly, including a second source of hydraulic pressure (not shown) independent of the first source and associated supply and return ducts, supplies pressurised hydraulic fluid to a supply duct 2. The supply return ducts of each supply assembly are connected to supply return ducts 3 and 4 respectively.

An actuator assembly, including an actuator (not shown) and an associated delivery duct and delivery return duct, receive pressurised fluid along a delivery duct 5 whilst a delivery return duct 6 completes the hydraulic circuit.

Apparatus to arrange powering of the actuator assembly from one or other of the supply assemblies or to isolate both is referenced as a unit 7. It includes a multi-position spool valve 8 which is connected to the ducts 1, 3, 2, 4 and 5, 6 and functions in the following manner.

In the first position, in which its spool lies to the left as drawn (illustrated in FIG. 1), the valve connects the supply duct 1 to the delivery duct 5 and the return duct 6 to the return duct 3 whilst the ducts 2 and 4 are isolated from the ducts 5 and 6.

In a second position, in which its spool lies in an intermediate position as drawn (illustrated in FIG. 2) the valve isolates both the supply ducts 1 and 2 (together with their associated return ducts 3 and 4) from the ducts 5 and 6.

In a third position, in which its spool lies to the right as drawn (illustrated in FIG. 3) the valve isolates the supply duct 1 and its return duct 3 from the ducts 5 and 6 whilst the duct 2 and its return duct 4 are connected to the ducts 5 and 6 respectively.

In the first position, the first supply assembly powers the actuator assembly, in the second position both the first and the second supply assemblies are isolated from the actuator assembly, and in the third position the second supply assembly powers the actuator assembly.

Selection of the various positions of the spool of the valve 8 is effected by selecting means which include piston and cylinder arrangements, that referenced 9 being situated to the right of the spool and formed by an end face of the spool (Area A1) and the spool housing, that referenced 10 being situated to the left of the spool and comprising an annular piston 11 (Area A2) and the spool housing, and that referenced 12 also being situated to the left of the spool and comprising a piston 13 (Area A3) lying co-axially with and extending through the piston 11. The selection means also includes a coil spring 17 (of rate K) which is arranged to urge the spool of valve 8 to the left as drawn.

Pressurising means are provided in the form of a piston and cylinder arrangement 18 having a double ended piston 19 (Areas AL1 and AL2) arranged to move to the right or left as drawn within a housing 20. To the right of the piston 19 is formed a pressure fluid reservoir 21. This pressurising arrangement 18 is arranged to provide a test pressure in a manner and sequence to be described.

Means for ensuring that if the test pressure is not attained, the second position remains selected, are provided in the form of a piston/cylinder arrangement as referenced 14 comprising a double ended piston 15 (Areas AP1 and AP2) arranged to shuttle, as drawn, to the right or to the left in a housing 16.

The piston and cylinder arrangement 9 is pressurised by hydraulic pressure tapped from the supply duct 1 along a line 22 acting upon Area A1, that referenced 10 is pressurised by hydraulic pressure tapped from the supply duct 2 along lines 23 and 23a acting upon Area A2, that referenced 12 is pressurised by pressure tapped from supply duct 2 or return duct 4, along lines 24 and 24a, or, alternatively, from pressure tapped from the supply duct 2 along lines 23, 23b, 23c and 24a, all acting upon Area A3. The positions of the spool of the valve 8 and the piston 15 of the piston and cylinder arrangement 14 effect such alternative pressurisation.

The piston and cylinder arrangement 14 is pressurised by pressure tapped from the supply duct 2 along lines 23 and 23d acting upon Area AP1 and by pressure tapped from the return duct 6 along a line 27 acting upon Area AP2.

Finally, the piston and cylinder arrangement 18 is pressurised by pressure tapped from the supply duct 2 along lines 23 and 23e acting upon Area AL1 and by pressure tapped from the delivery duct 5 along a line 29 acting upon area AL2. This latter line also replenishes the reservoir 21.

Restricted orifices 30 and 31 are provided as shown; their respective functions are described below.

Referring now to FIG. 1, in which the first position of the spool valve 8 is shown selected so that the first supply duct 1 is connected to the delivery duct 5, the return duct 6 is connected to the return duct 3, and the return duct 4 is connected to the line 24, the forces acting upon the spool are as follows:

Biassing to the left, the first supply pressure (P1) in the duct 1 acting via the line 22 upon area A1, and, Biassing to the right, the second supply pressure (P2) in the duct 2 acting via the lines 23 and 23a upon area A2, plus the second return pressure (P4) in the duct 4 acting via the lines 24 and 24a upon area A3.

This can be conveniently stated:

$$(P1 \times A1) \geqq (P2 \times A2) + (P4 \times A3)$$

In this condition, the piston 15 is held to the right so that the line 23c is isolated from the line 23b, the forces acting upon the piston being as follows:

Biassing to the left, the return pressure (P6) in the duct 6 acting via the line 27 upon area AP2, and Biassing to the right, the second supply pressure (P2) in the duct 2 acting via the lines 23 and 23d upon area AP1.

This can be conveniently stated:

$$(P2 \times AP1) \geqq (P6 \times AP2)$$

Similarly, in this condition, the piston 19 is held to the left awaiting usage and the reservoir 21 is filled with pressure fluid, the forces acting being as follows:

Biassing to the left, the delivery pressure (P5) in the duct 5 acting via the line 29 upon area AL2, and, Biassing to the right, the second supply pressure (P2) in the duct 2 acting via the lines 23 and 23e upon area AL1.

This can be conveniently stated:

$$(P5 \times AL2) \geqq (P2 \times AL1)$$

Figure 2:
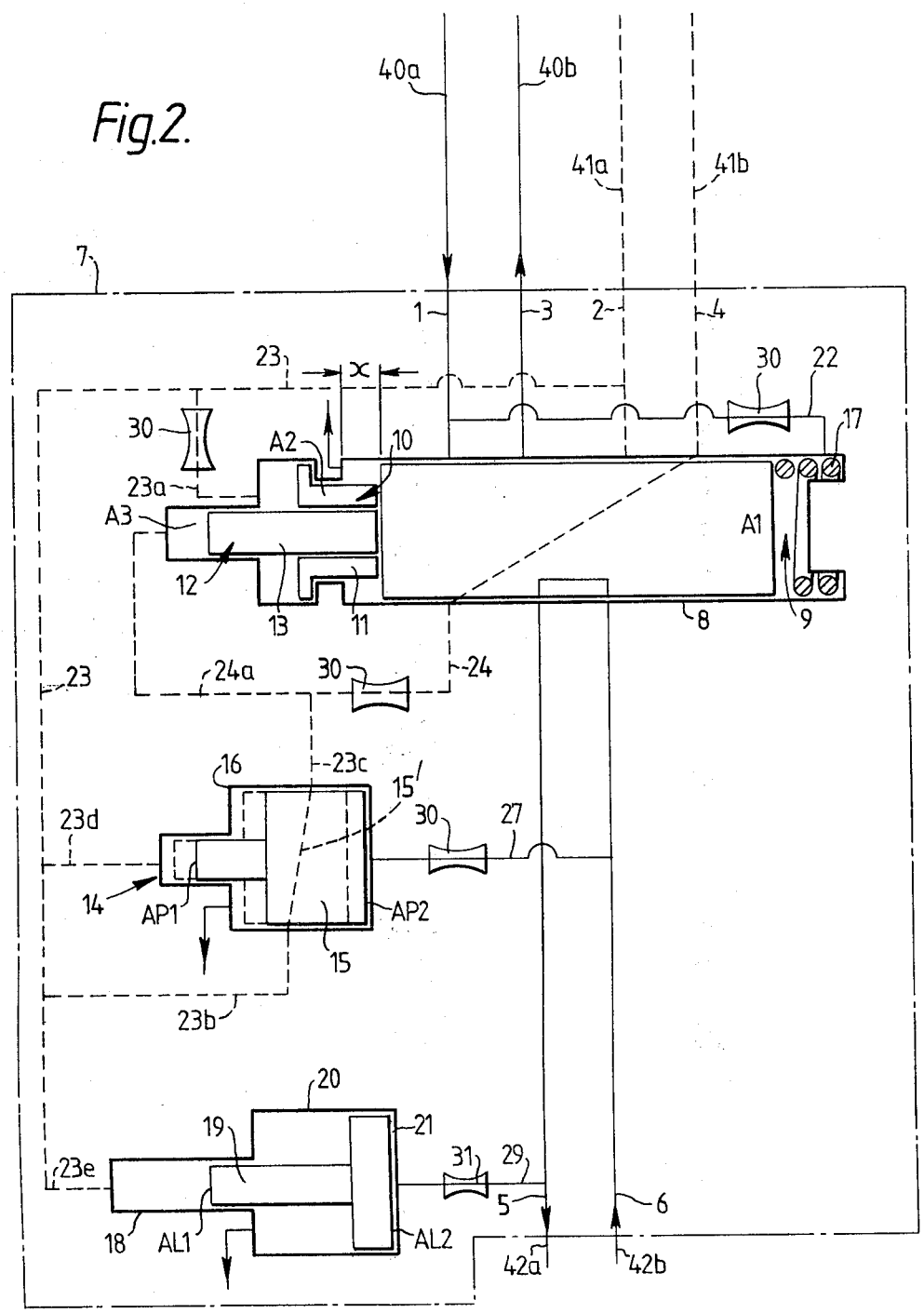
FIG. 2 is a diagram of the apparatus in a further condition.

Referring now to FIG. 2 initially and FIG. 3 subsequently, a failure of the actuator assembly or the first supply assembly due to fluid loss or pump failure causes a reduction of pressure in duct 1 from P1 to $P1_f$, but the second supply pressure (P2) in the duct 2 and the second return pressure (P4) in duct 4 remain the same. The forces acting upon the spool are now as follows:

$$(P1_f \times A1) < (P2 \times A2) + (P4 \times A3)$$

so that the piston 11 (area A2) moves to the right to the end of its travel and moves the spool to the intermediate or second position of FIG. 2, it being noted that P4 pressure remains acting upon the piston 13 (area A3) to maintain contact between it and the spool. The spool of the valve 8 is maintained in this intermediate position by the coil spring 17 the effect of which can be stated:

$$(P2 \times A2) > Kx > (P4 \times A3)$$

where

K is the spring rate, and, x is the distance moved by the spool.

In this condition, the piston 19 is urged to the right, thereby, if possible owing to the degree of any leakage present, pressurising the ducts 5 and 6 (together with their actuator) to a test pressure, $P6_T$.

The piston 19 is urged to the right by the second supply pressure P2 acting via the lines 23 and 23e on area AL1.

Subsequently, if $P6_T$ is achieved the piston 15 is urged temporarily to the left, thereby commoning the line 23b with the line 23c as shown in broken outline at 15', so that the second supply pressure P2 in the duct 2 acts upon the piston 13 on area A3 via the lines 23, 23b, 23c and 24a, the forces acting upon the piston 15 being as follows:

Biassing to the left, the test pressure $P6_T$ in the duct 6 (and 5 since these ducts are commoned) acting via the line 27 on area AP2, and, Biassing to the right, the second supply pressure P2 in the duct 2 acting via the lines 23 and 23d on area AP1.

This can be conveniently stated:

$$(P2 \times AP1) < (P6_T \times AP2)$$

Figure 3:
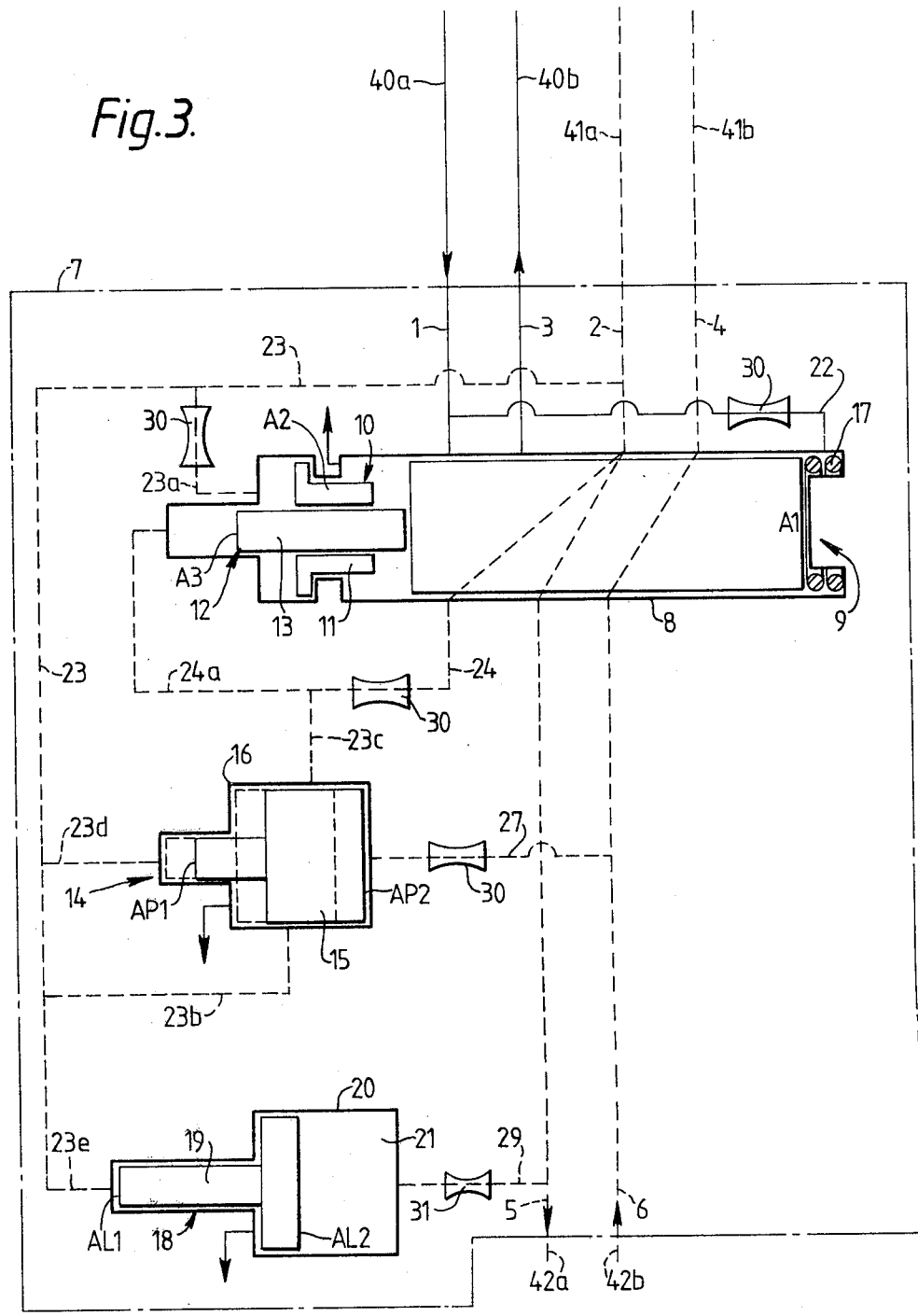
FIG. 3 is a similar diagram with the apparatus in yet a further condition.

Referring now to FIG. 3, the spool of the valve 8 is moved to the final or third position of FIG. 3. This final movement to the right connects the second supply pressure (P2) in the duct 2 to the delivery duct 5 and the return duct 6 to the return duct 4. The line 24 is also connected to the second supply duct 2 via the spool. Thus the actuator assembly is supplied by the second supply assembly and it is ensured that the second supply pressure P2 acts upon the piston 13 irrespective of the position of piston 15 to effectively hold the spool to the right.

The forces acting on the spool of the valve 8 are now:

Biassing to the left, only the coil spring rate multiplied by the spool movement, since the first supply pressure P1 has dissipated, and, Biassing to the right, the second supply pressure P2 in the duct 2 acting initially via the lines 23, 23b, 23c and 24a and, finally, via the lines 24 and 24a upon area A3. Since the pressure in duct 6 decreases from the test pressure $P6_T$ to the level of the return pressure in the duct 4 the piston 15 moves to the right, and since the pressure in duct 5 increases from the test pressure $P6_T$ to the level of the pressure in duct 2, the piston 19 moves to the left also.

A failure of the actuator assembly allowing leakage and hence low pressure in the ducts 5 and 6 causes the spool of the valve 8 to move from the position of FIG. 1 to the position of FIG. 2. Up to the spool reaching the position of FIG. 2, the sequence of events and pressures acting are as previously described.

Since there is leakage, the pressures in the ducts 5 and 6 will reduce to ambient. The piston 19 then moves to the right as shown in FIG. 2 being moved by the pressures acting upon the differential areas AL1 and AL2.

The fluid in the reservoir 21 is thus forced into the lines 5 and 6 and seeks to pressurise them to the test pressure $P6_T$. The orifice 31 controls the flow rate from reservoir 21 and if this is less than the leakage rate from the actuator (and its delivery ducts 5, 6), the test pressure $P6_T$ will not be achieved so that the piston 15 does not move to the left as previously and the spool remains in the intermediate position of FIG. 2 ensuring that the ducts 5 and 6 are isolated. If the test pressure is reached then the piston 15 moves as previously described causing the spool to move to the position of FIG. 3 so that the ducts 2, 4 and 5, 6 are in flow communication.

The orifices 30 are included to prevent transient internal leakage flows during switching, to prevent surge flows which could cause inadvertent operation, to control spool and piston velocity to prevent water hammer, and also to endow the apparatus with a fail safe characteristic in certain failure cases.

The presently described embodiment has the following approximate pressures:

| | | |
|---|---|---|
| P1 | = | 4000 PSI |
| P2 | = | 4000 PSI |
| $P1_F$ | = | 200 PSI |
| $P6_T$ | = | 500 PSI (when $P6_T$ < 450 PSI the test pressure is not effectively attained but when $P6_T$ > 450 PSI the test pressure is effectively attained). |
| P5 | = | 4000 PSI, and, |
| P6 | = | 100 PSI |

With these pressures, the following piston Area ratios are chosen:

| | | |
|---|---|---|
| A1; A2; A3 | = | 3.4; 1.7; 1.0; |
| AP1; AP2 | = | 1.0; 9.0; and, |
| AL1; AL2 | = | 1.0; 8.0. |

Figure 4:
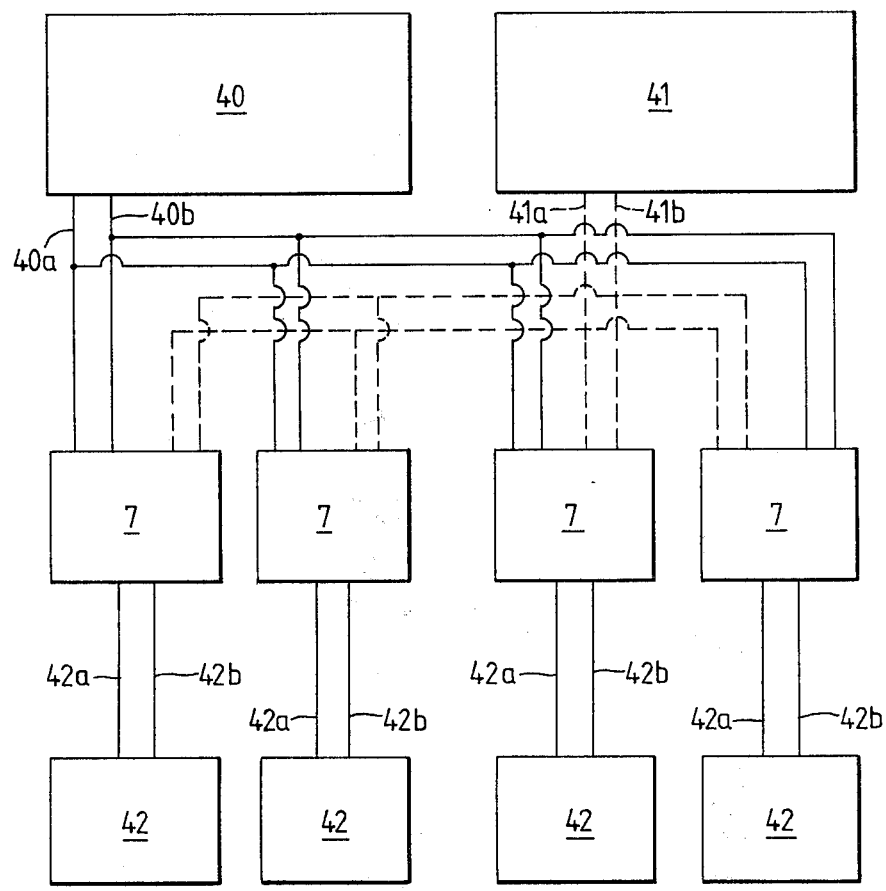
FIG. 4 is a diagram of an aircraft hydraulic system incorporating the apparatus of FIGS. 1 to 3.

Referring now to FIG. 4, an aircraft hydraulic system includes a first hydraulic supply assembly 40, a second hydraulic supply assembly 41, and a plurality of hydraulic actuator assemblies 42.

The first hydraulic supply assembly 40 includes a first supply duct 40a and a first supply return duct 40b, the second hydraulic supply assembly 41 includes a second supply duct 41a and a second supply return duct 41b, whilst each actuator assembly 42 includes a delivery duct 42a and a delivery return duct 42b.

These ducts respectively connect to ducts 1 and 3, 2 and 4, and 5 and 6 of hydraulic apparatus of the type described with reference to FIGS. 1 to 3, such that each actuator assembly 42 is associated with one complete unit 7 of the apparatus.

In operation, assuming all the actuator assemblies 42 to be initially powered by the first supply assembly 40, if a failure occurs in the first supply assembly 40 or in any one of the actuator assemblies 42, this will be evidenced by low pressure. At this stage, the exact location of the failure is unknown.

The low pressure immediately causes that unit 7 associated with each actuator assembly 42 to temporarily isolate its actuator assembly 42 from both the first and the second supply assemblies 40 and 41. Each unit 7 then rapidly injects or attempts to inject a test pressure into its own actuator assembly 42. If the test pressure is attained or is already attained, then that unit 7 selects the second supply assembly 41 for its associated actuator assembly 42 maintaining the first supply assembly 40 isolated. This ensures that the second supply assembly 41 is utilized only for an actuator assembly which is found to be operational, or at least partially operational if as ascertained by the attainment of a certain level of test pressure. If, however, the test pressure is not attained in an actuator assembly indicating an intolerable failure in that actuator assembly, then its associated unit 7 maintains isolation of both the first and second supply assemblies for that actuator assembly, and that actuator assembly alone.

Naturally, if a tested actuator assembly is found to be fully operable, then the second supply assembly 41 is enjoined, it being evident that the fault is in the first supply assembly 40. Accordingly, all actuator assemblies 42 are automatically and rapidly switched to the second supply assembly. If, as discussed above, one actuator assembly 42 has an intolerable fault, as decided by the non-attainment of the test pressure, then that actuator assembly 42 is isolated and the remainder are automatically and rapidly switched to the second supply assembly 41 for continued operation. From the above description it is apparent that if an actuator has a tolerable fault it is switched to the second supply assembly 41 along with those which are fault free to allow continued operation for a period limited by the ability of the second supply assembly 41 to maintain pressure; in other words, the period would be sufficient for an aircraft to return home safely.

We claim:

1. Hydraulic apparatus including first supply and supply return ducts for connection to a first hydraulic supply assembly, second supply and supply return ducts for connection to a second hydraulic supply assembly, delivery and delivery return ducts for connection to an actuator assembly, multi-position valve means which, in a first position, isolates the second supply and supply return ducts and connects the first supply and supply return ducts to the delivery and delivery return ducts, in a second position includes both the first and second supply and supply return ducts from the delivery and delivery return ducts, and in a third position isolates the first supply and supply return ducts and connects the second supply and supply return ducts to the delivery and delivery return ducts, selecting means for selecting the first position in response to normal pressures within the first supply and supply return ducts and the delivery and delivery return ducts, for selecting the second position from the first position in response to abnormally low pressures within either of the first supply and supply return ducts or the delivery and delivery return ducts, and for selecting the third position from the second position in response to the attainment of a temporary test pressure in the delivery and delivery return ducts, pressurising means for attempting to attain said temporary test pressure when the second position is selected, and means for ensuring that if the temporary test pressure is not attained, the second position remains selected.

2. Hydraulic apparatus according to claim 1 wherein the multi-position valve means includes an axially movable spool having opposed ends, and the selecting means includes bias means arranged to act in opposition upon said opposed ends to effect selective axial movement of the spool.

3. Hydraulic apparatus according to claim 2 wherein the bias means include, a first piston/cylinder arrangement and spring means acting upon one end of the spool, a second piston/cylinder arrangement and a third piston/cylinder arrangement acting in opposition to the first piston/cylinder arrangement and the spring means upon the other end of the spool.

4. Hydraulic apparatus according to claim 3 wherein the first piston/cylinder arrangement is in pressure communication with the first supply duct tending to urge the spool towards its first position.

5. Hydraulic apparatus according to claim 3 wherein the second piston/cylinder arrangement is in pressure communication with the second supply duct to tend to urge the spool towards the second position.

6. Hydraulic apparatus according to claim 3, wherein the third piston/cylinder arrangement is in pressure communication alternatively with the second supply return duct to tend to urge the spool towards the second position or the second supply duct to tend to urge the spool towards the third position.

7. Hydraulic apparatus according to claim 1 wherein the pressurising means comprises a hydraulic fluid reservoir, a piston for injecting the stored reservoir fluid into the delivery duct, said piston being urged in the injection direction by being in pressure communication with the second supply duct, and being urged in the storage position by being in pressure communication with the delivery duct.

8. Hydraulic apparatus according to claim 3 wherein said means for ensuring that if the test pressure is not attained the second position of the spool remains selected comprises a valve, which in one condition prevents pressure communication between the second supply duct and the third piston/cylinder arrangement, and in a further position provides such pressure communication, the valve being urged toward said one condition by being in pressure communication with the second supply duct, and being urged towards said further position by being in pressure communication with the delivery return duct.

9. Hydraulic apparatus according to claim 3 including means for ensuring that when the third position of the spool is selected it remains selected comprising a pressure communication between the second supply duct and the third piston/cylinder arrangement effective only when the spool is in the third position.

10. An aircraft hydraulic system including in combination a first hydraulic supply assembly, a second hydraulic supply assembly, and a plurality of actuator assemblies, each actuator assembly having connected, between it and the two said supply assemblies, hydraulic apparatus including first supply and supply return ducts for connection to said first hydraulic supply assembly, second supply and supply return ducts for connection to said second hydraulic supply assembly, delivery and delivery return ducts for connection to a said respective actuator assembly, multi-position valve means which, in a first position, isolates the second supply and supply return ducts and connects the first supply and supply return ducts to the delivery and delivery return ducts, in a second position isolates both the first and second supply and supply return ducts from the delivery and delivery return ducts, and in a third position isolates the first supply and supply return ducts and connects the second supply and supply return ducts to the delivery and delivery return ducts, selecting means for selecting the first position in response to normal pressures within the first supply and supply return ducts and the delivery and delivery return ducts, for selecting the second position from the first position in response to abnormally low pressures within either of the first supply and supply return ducts or the delivery and delivery return ducts, and for selecting the third position from the second position in response to the attainment of a temporary test pressure in the delivery and delivery return ducts, pressurizing means for attempting to attain said temporary test pressure when the second position is selected, and means for ensuring that if the temporary test pressure is not attained, the second position remains selected.

* * * * *